(12) United States Patent
Srinivasan et al.

(10) Patent No.: US 9,362,598 B2
(45) Date of Patent: Jun. 7, 2016

(54) TRACTION BATTERY ASSEMBLY WITH THERMAL DEVICE

(71) Applicant: FORD GLOBAL TECHNOLOGIES, LLC, Dearborn, MI (US)

(72) Inventors: Giriraj Srinivasan, Troy, MI (US); Patrick Daniel Maguire, Ann Arbor, MI (US); Sai K. Perumalla, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 14/467,547

(22) Filed: Aug. 25, 2014

(65) Prior Publication Data
US 2016/0056516 A1    Feb. 25, 2016

(51) Int. Cl.
| | |
|---|---|
| *H01M 10/6556* | (2014.01) |
| *H01M 10/613* | (2014.01) |
| *H01M 10/625* | (2014.01) |
| *B60L 11/18* | (2006.01) |
| *H01M 2/10* | (2006.01) |

(52) U.S. Cl.
CPC ........... *H01M 10/6556* (2015.04); *B60L 11/18* (2013.01); *H01M 2/1077* (2013.01); *H01M 10/613* (2015.04); *H01M 10/625* (2015.04); *H01M 2220/20* (2013.01)

(58) Field of Classification Search
CPC .......... H01M 10/613; H01M 10/6556; H01M 2/1077; H01M 2220/20; B60L 11/18
See application file for complete search history.

(56) References Cited

U.S. PATENT DOCUMENTS

| | | | |
|---|---|---|---|
| 2011/0244297 A1* | 10/2011 | Kruger | H01M 10/625 429/120 |
| 2011/0300428 A1 | 12/2011 | Sohn | |
| 2011/0318628 A1 | 12/2011 | Heim | |
| 2012/0171532 A1* | 7/2012 | Lee | H01M 2/1077 429/72 |
| 2012/0224326 A1* | 9/2012 | Kohlberger | H01M 2/1077 361/699 |
| 2013/0122331 A1 | 5/2013 | McDonald | |

FOREIGN PATENT DOCUMENTS

JP    2008-275190    * 11/2008  ............... F28F 9/00

OTHER PUBLICATIONS

TradeIndia.com (Dhansampada Power, product entry, Wayback web date taken as Feb. 10, 2009, {http://www.tradeindia.com/suppliers/traction-batteries.html}.*

* cited by examiner

*Primary Examiner* — Patrick Ryan
*Assistant Examiner* — Aaron Greso
(74) *Attorney, Agent, or Firm* — David B. Kelley; Brooks Kushman P.C.

(57) ABSTRACT

A traction battery assembly includes cells stacked in an array and a thermal plate positioned against the array. An interior of the thermal plate defines a C-channel formed from several chambers spanning a length of the array and configured to circulate fluid therein to facilitate heat transfer with the cells.

19 Claims, 10 Drawing Sheets

FIG. 12

TRACTION BATTERY ASSEMBLY WITH THERMAL DEVICE

TECHNICAL FIELD

The present disclosure relates to thermal devices for battery assemblies and particularly to traction battery assemblies used for operating hybrid and electric vehicles.

BACKGROUND

Vehicles such as battery-electric vehicles (BEVs), plug-in hybrid electric vehicles (PHEVs) or full hybrid-electric vehicles (FHEVs) contain a battery, such as a high voltage battery, to act as an energy source for the vehicle. Battery capacity, operation and cycle life can change depending on the operating temperature of the battery. It is generally desirable to maintain the battery within a specified temperature range while the vehicle is operating or while the vehicle is charging. Vehicles with batteries may include thermal management systems to provide temperature control for the batteries to extend battery life and improve performance.

SUMMARY

A traction battery assembly includes cells stacked in an array and a thermal plate disposed against the array. The thermal plate includes a C-channel interior defined by heat-transfer, inlet and outlet chambers configured to circulate fluid therein. The chambers span a length of the array. The heat-transfer chamber is disposed between the array and the inlet and outlet chambers.

A battery assembly includes a cell array and a thermal device defining an interior including a horizontal top adjacent the array, opposing vertical side surfaces and a horizontal mid-plate arranged to define a pair of openings. Each of the openings is between the mid-plate and one of the surfaces. The interior further includes a heat-transfer chamber above the mid-plate and inlet and outlet chambers below the mid-plate. The chambers are fluidly connected via the openings.

A traction battery assembly includes first and second arrays. Each of the arrays includes a plurality of stacked cells. The assembly also includes a thermal plate defining opposing first and second sides, and sandwiched between the arrays such that the first side is disposed against the first array and the second side is disposed against the second array. The thermal plate includes a separator wall disposed between the first and second sides to define a first cavity between the first side and the separator wall and a second cavity between the second side and the separator wall. The first cavity includes a first plate disposed between the first side and the separator wall and the second cavity includes a second plate disposed between the second side and the separator wall.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
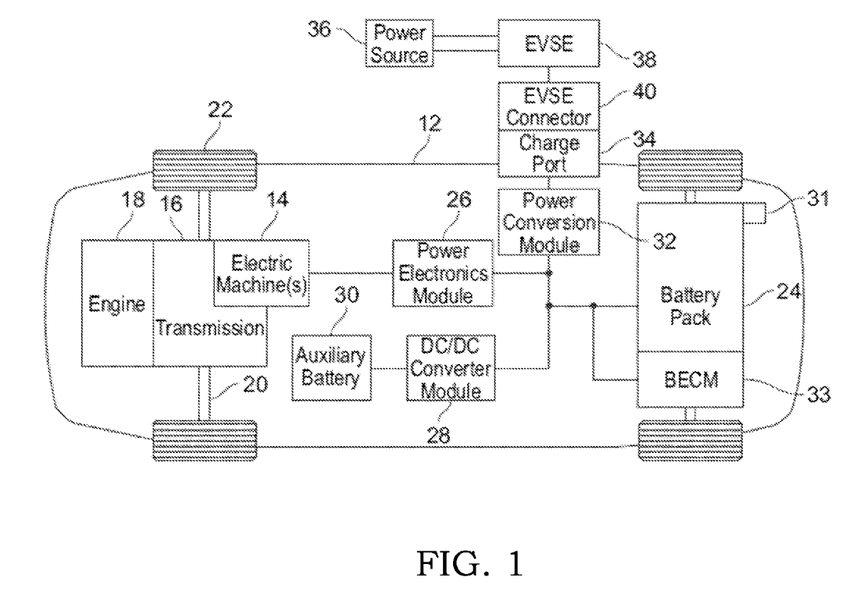
FIG. 1 depicts a schematic of a typical plug-in hybrid-electric vehicle.

FIG. 1 depicts a schematic of a typical plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays may include one or more battery cells.

The battery cells, such as a prismatic or pouch cell, may include electrochemical cells that convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another.

Different battery pack configurations may be available to address individual vehicle variables including packaging constraints and power requirements. The battery cells may be thermally regulated with a thermal management system. Examples of thermal management systems may include air cooling systems, liquid cooling systems and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. In a pure electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 is a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via dedicated electrical conduits.

FIGS. 2 through 12, and the related discussion, describe examples of the traction battery assembly 24. Referring to FIGS. 2, 3, 4A and 4B, a portion of a traction battery assembly 50 is shown. The battery assembly 50 includes at least one modular assembly having a thermal plate 52 that supports at least one cell array 54. The thermal plate may be attached to a tray (not shown) or may serve as the tray. If the thermal plate 52 is the tray, additional materials may be added to the thermal plate to support the array and provide attachment to the vehicle. The at least one array 54 includes a plurality of stacked battery cells 56. Each battery cell 56 may have a tray side 58 that is disposed adjacent to the thermal device 52. Each cell 56 may include a terminal side 60 that includes terminals 61 extending upwardly from the terminal side 60 of each cell 56.

The thermal plate 52 may be configured to add or remove heat from the array 54. The thermal plate 52 may include a base 63 that may be made of an extruded aluminum part. Alternatively, the base 63 may be cast, molded or formed using other fabrication techniques. The base 63 may be formed of an insulating material such as a polymer to reduce heat transfer between the thermal plate 52 and surrounding environment.

Figure 2:
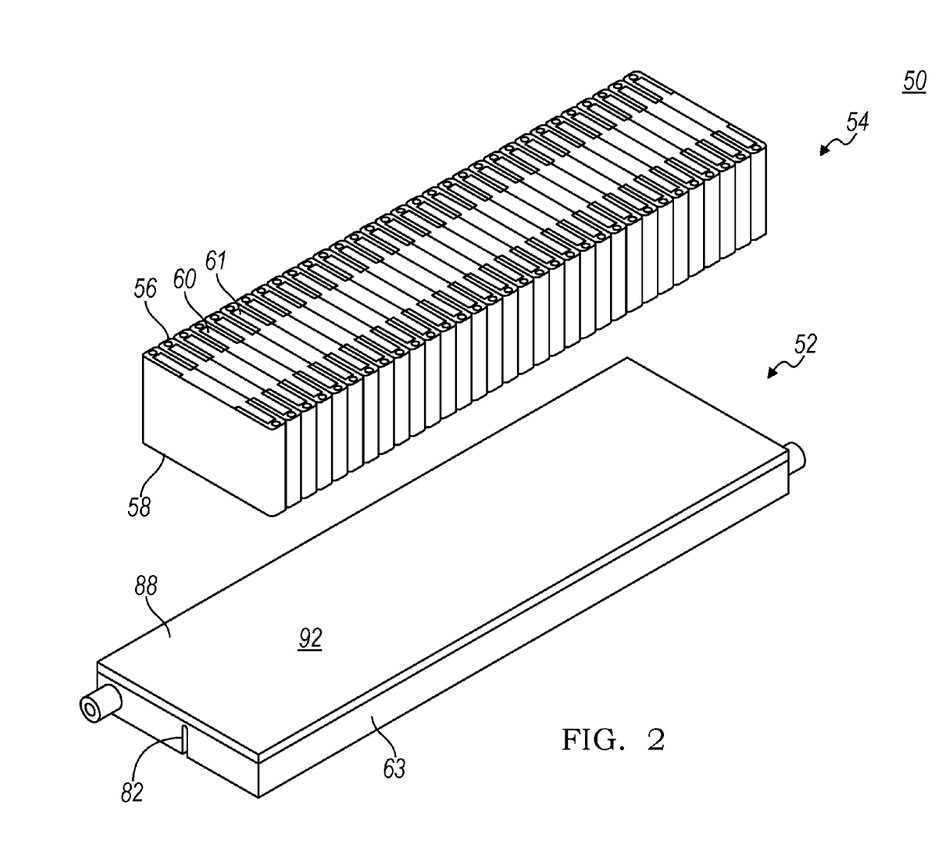
FIG. 2 is an exploded view of a traction battery assembly with a thermal device.
Figure 3:
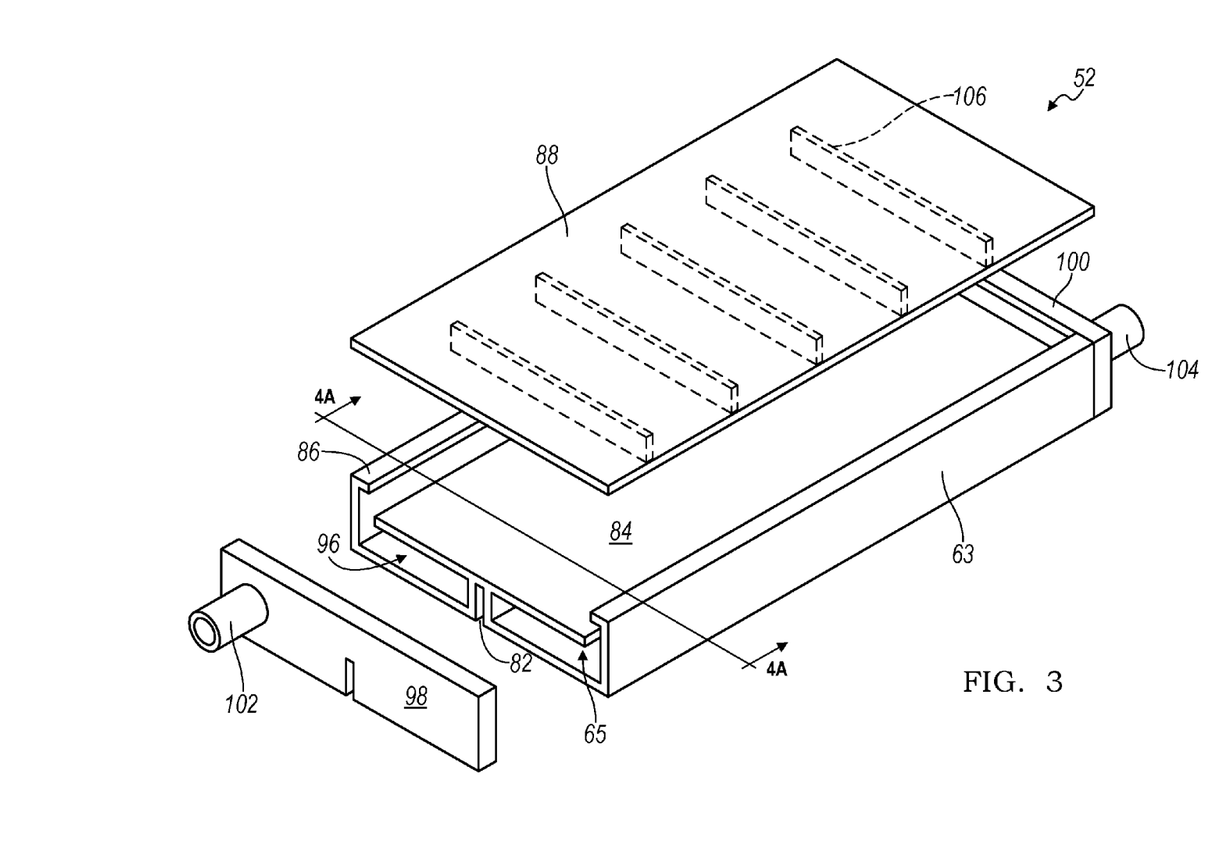
FIG. 3 is an exploded view of the thermal device from FIG. 2.
Figure 4A:
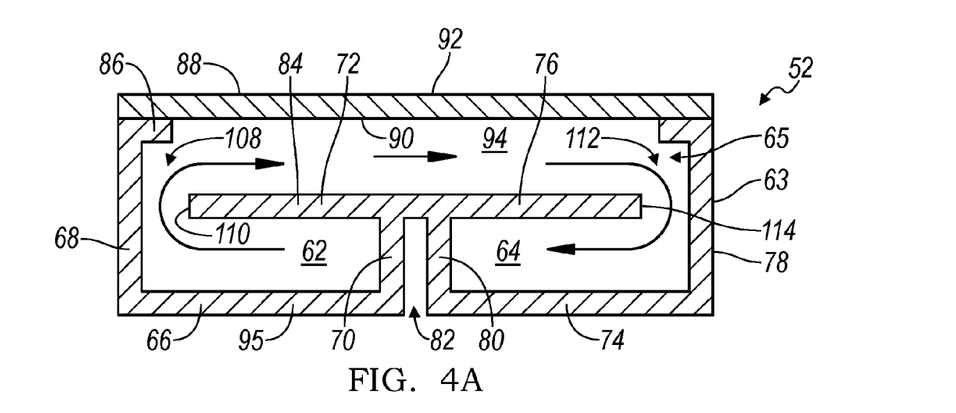
FIG. 4A is a section view of the thermal device shown in FIGS. 2 and 3 along cut line 4A-4A.

A top plate 88 may be attached to the base 63 along a pair of flanges 86. The top plate 88 may be attached to the flanges 86 by brazing, welding, adhesive or other attachment technique. The top plate 88 and the base 63 may cooperate to define a C-channel interior 65. The C-channel interior 65 may include a heat-transfer chamber 94, an inlet chamber 62 and an outlet chamber 64. A mid-plate 84 may be disposed within the thermal plate 52 and separate the heat-transfer chamber 94 from each of the inlet and outlet chambers 62, 64. The mid-plate 84 may be attached to a bottom 95 of the thermal plate 52 via at least one vertical wall.

The inlet chamber 62 is defined by a bottom wall 66, a portion 72 of the mid-plate 84, an outer sidewall 68 and an inner sidewall 70. The outlet chamber 64 is defined by a bottom wall 74, a portion 76 of the mid-plate 84, an outer sidewall 78 and an inner sidewall 80. The inner sidewall 70 may be spaced apart from the inner sidewall 80 creating a thermal separator, such as an air gap, between the inlet and outlet chambers 62, 64 reducing heat transfer between the chambers. The inner sidewall 70 and the outer sidewall 80 may cooperate to define a channel 82 recessed into the thermal device 52. The sidewalls 68, 78 may extend above the mid-plate 84 to define a pair of openings in the chambers. The inlet chamber 62 includes an opening 108 defined between an interior surface of the sidewall 68 and a longitudinal sidewall 110 of the mid-plate 84. The outlet chamber 64 includes an opening 112 defined between an interior surface of the sidewall 78 and a longitudinal sidewall 114 of the mid-plate 84.

The heat-transfer chamber 94 may be defined by the top plate 88, the mid-plate 84 and the opposing sidewalls 68, 78. The heat-transfer chamber 94 is disposed between the array 54 and the inlet and outlet chambers 62, 64. The heat-transfer chamber 94 is in thermal communication with the array 54 and exchanges thermal energy with the array 54 as fluid is circulated through the chamber 94.

At least one fin 106 may be disposed with in the heat-transfer chamber 94 to direct fluid flow and promote more effective heat exchange between the array 54 and the fluid circulated through chamber 94. Each fin 106 may be attached to a bottom surface 90 of the top plate and extend towards the mid-plate 84. Each fin 106 may or may not connect to the mid-plate 84. Each fin 106 may be arranged such that the long side of the fin 106 is perpendicular to the sidewalls 68, 78.

The thermal plate 52 may include a pair of end caps to seal a pair of open ends 96 on opposing sides of the base 63 particularly if the base 63 is formed by extrusion. Alternatively, the end caps may be integrally formed with the base, particularly if the base 63 is cast or molded. An inlet end cap 98 may be attached to one open end and an outlet end cap 100 may be attached to the other open end. The end caps may be attached by brazing, welding, adhesive or other attachment technique. In some designs the end caps are integrally formed. The inlet cap 98 may include an inlet port 102 in fluid communication with the inlet chamber 62 and the outlet cap 100 may include an outlet port 104 in fluid communication with the outlet chamber 64. The inlet port 102 and the outlet port 104 may be defined into the interior 65 at a location below the mid-plate 84. The inlet and outlet ports 102, 104 may be connected to a thermal management system that may include a pump, a reservoir, a heat exchanger, a controller, a fluid medium and a plurality of lines interconnecting the ports, pump, heat exchanger and reservoir. The thermal management system may be configured to circulate a fluid medium through the thermal plate 52. The fluid medium may be a liquid or a gas. For example, the fluid medium may be an ethylene glycol mixture, refrigerant, or air. For example, the thermal management system supplies the fluid medium into the thermal plate 52 via the inlet port 102. The fluid medium then enters into the inlet chamber 62 creating a positive pressure in the inlet chamber 62. The positive pressure drives the fluid medium through the heat-transfer chamber 94 and into the outlet chamber 64. The fluid medium then exits the thermal plate 52 through the outlet port 104 for recirculation in the thermal management system.

The array 54 is may be disposed against a top surface 92 of the top plate 88. The top plate 88 may be made of a thermally conductive material, such as aluminum. The top plate 88 is disposed between the heat transfer chamber 94 and the array 54, and aids in heat transfer between the array 54 and the fluid medium. The fluid medium either adds or removes heat from the array 54 as the fluid medium flow across the heat-transfer chamber 94. If the fluid medium temperature is colder than the array temperature, the fluid medium absorbs thermal energy from the array to cool the array 54. If the fluid medium temperature is warmer than the array temperature, the array 54 absorbs thermal energy form the fluid medium to warm the array 54.

Figure 4B:
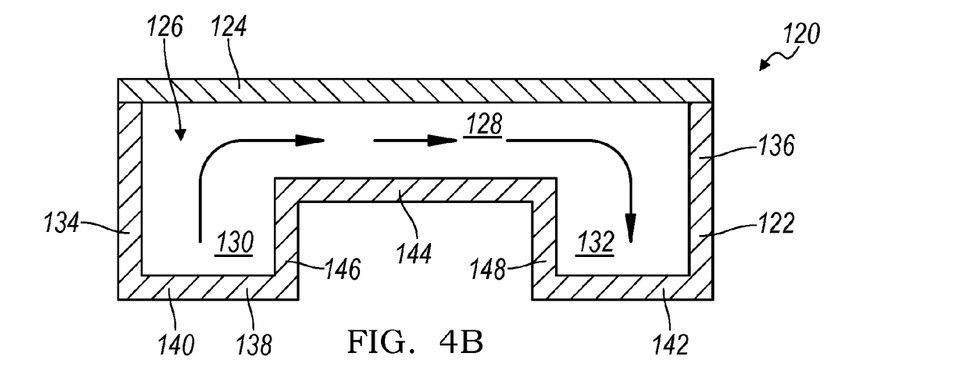
FIG. 4B is a side cross-sectional view of another thermal device.

Referring to FIG. 4B, a front cross sectional view is shown of another thermal plate that may be used with battery assembly 50. The thermal plate 120 may include a base 122 and a top plate 124 attached to the base 122. The base 122 and the top plate 124 cooperate to define a C-channel interior 126. The interior 126 may include a heat-transfer chamber 128, an inlet chamber 130 and an outlet chamber 132. The chambers may span a length of the array (not shown). The base 122 includes a pair of opposing sidewalls 134, 136 depending from the top plate 124. The sidewalls 134, 136 may be interconnected by a bottom 138. The bottom 138 may include a pair of horizontal walls 140, 142 that are each attached to one of the longitudinal sidewalls 134, 136. The bottom 138 may also include a mid-plate 144 that is connected to the horizontal walls 140, 142 via a pair of vertical walls 146, 148. A battery array (not shown) may be disposed against the top plate 124 to place the array in thermal communication with the thermal plate.

Figure 4C:
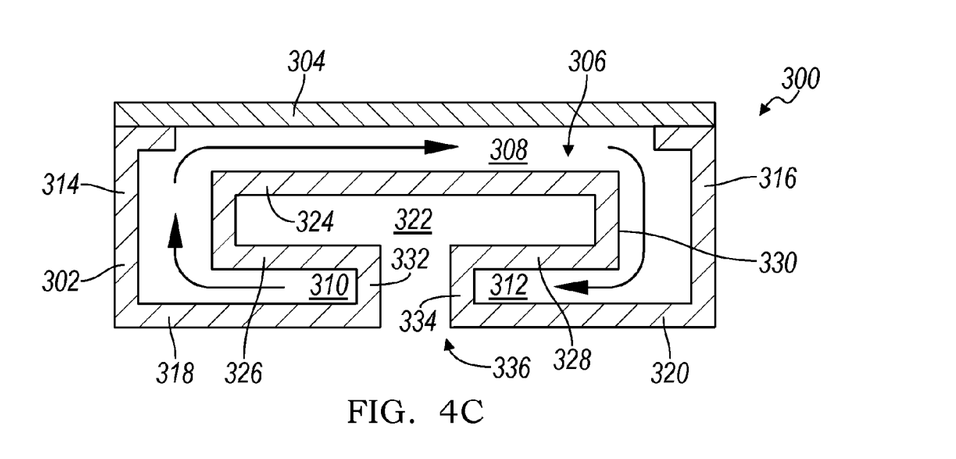
FIG. 4C is side cross-sectional view of yet another thermal device.

Referring to FIG. 4C, a front cross sectional view is shown of another thermal plate that may be used with battery assembly 50. The thermal plate 300 may include a base 302 and a top plate 304 attached to the base 302. The base 302 and the top plate 304 cooperate to find a C-channel interior 306. The interior 306 may include a heat transfer chamber 308, an inlet chamber 310 and an outlet chamber 312. The chambers may span a length of the array (not shown). The base 302 includes a pair of opposing sidewalls 314, 316 depending from the top plate 304. The sidewall 314 is attached to a first bottom wall 318 and the sidewall 316 is attached to a second bottom wall 320. The bottom walls 318, 320 collectively define a bottom surface of the thermal plate 300.

The base 302 may include an air gap 322 disposed within the C-channel interior 306. The air gap 322 is defined between a mid-plate 324 and a pair of lower walls 326 and 328. The mid-plate and the pair of lower walls may be interconnected by a pair of opposing sidewalls 330 that further define the air gap 322. The lower wall 326 may be connected to the first bottom wall 318 via vertical wall 332 and the lower wall 328 may be connected to the second bottom wall 320 via vertical wall 334. The vertical walls 332, 334 may be spaced apart to define an entrance channel 336 that opens up into the air gap 322. In some embodiments, the air gap 322 may be at least partially filled with an insulating material. In other embodiments, the air gap 322 may be omitted in lieu of extra thick walls that displace the area where the air gap 322 is disposed.

Figure 5:
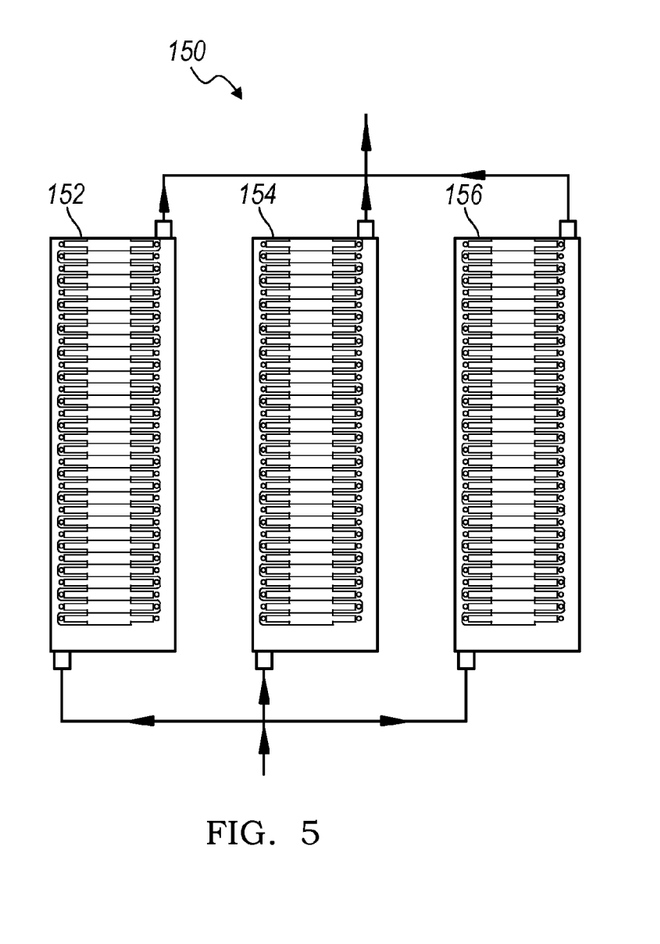
FIG. 5 is a plan view of battery assembly having multiple thermal devices connected in parallel.

Referring to FIG. 5, the fluid medium lines of multiple modular assemblies may be interconnected to maximize the use of the lines and to save assembly costs. A traction battery assembly 150 may include three modular assemblies 152, 154, 156 that each include a thermal plate and an array of cells. This is merely an example and more or less modular assemblies may be used. The modular assemblies may be connected in parallel to the thermal management system.

Figure 6:
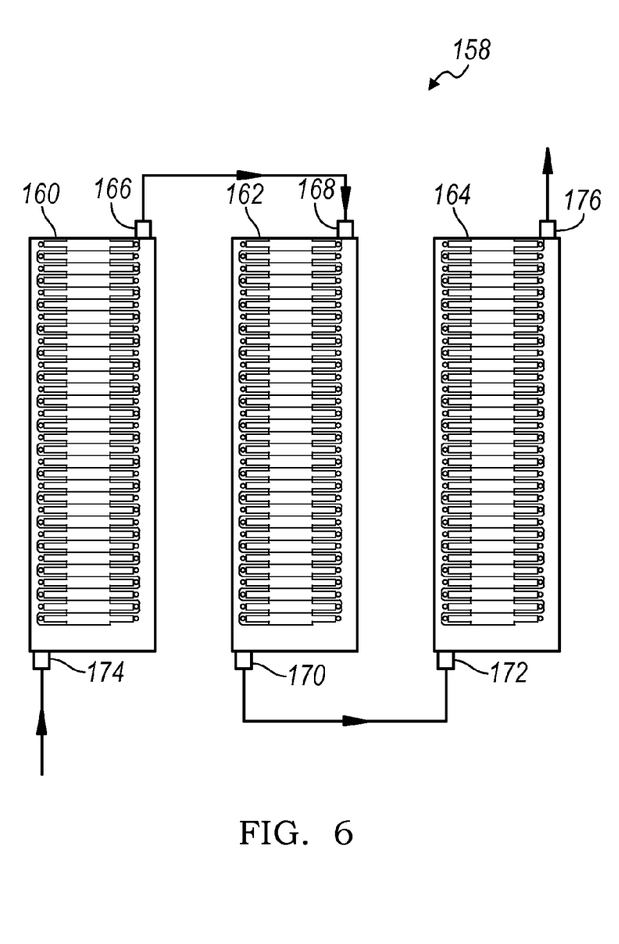
FIG. 6 is a plan view of battery assembly having multiple thermal devices connected in series.

Referring to FIG. 6, a traction battery assembly 158 may include three modular assemblies 160, 162, 164 that each include a thermal plate and an array of cells. This is merely an example and more or less modular assemblies may be used. The thermal plates of each assembly are connected in series. Thus, the outlet port 166 is fluidly connected to the inlet port 168. The outlet port 170 is fluidly connected to inlet port 172. The inlet port 174 is connected to the thermal management system and the outlet port 176 is connected to the thermal management system.

Figure 7:
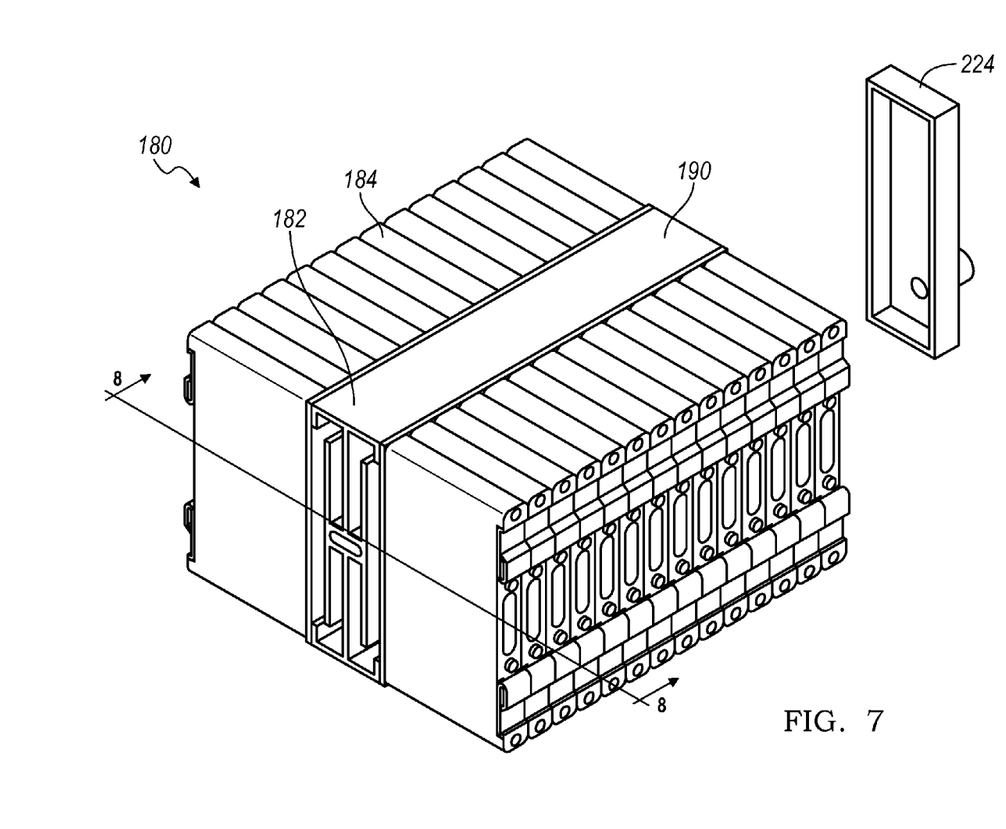
FIG. 7 is a perspective view of another traction battery assembly with one of the end caps removed for clarity.
Figure 8:
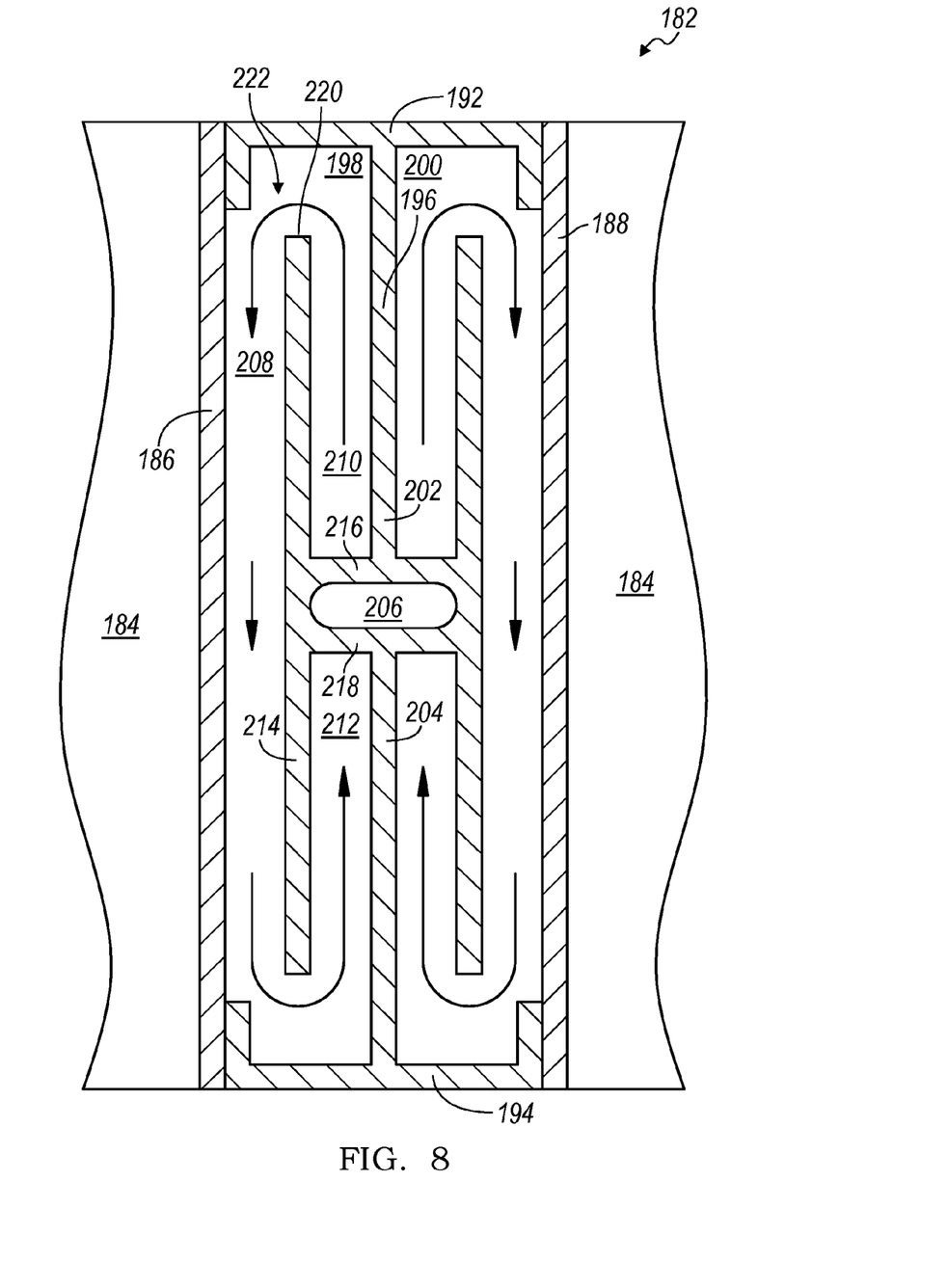
FIG. 8 is a section view of the traction battery assembly of FIG. 7 along cut line 8-8.

Referring to FIGS. 7 and 8, a traction battery assembly 180 is shown. The battery assembly 180 may include at least one modular assembly having a thermal plate 182 sandwiched between a pair of cell arrays 184. The thermal plate 182 may include a body 190 connected to first and second plates 186, 188 that are each in contact with one of the pair of arrays 184. The body 190 may be an extruded aluminum section or may be formed using other fabrication techniques. The body 190 may include a top 192 and a bottom 194 that are each connected between the first and second plates 186, 188. The body 190 may also include a separator wall 196 disposed between and substantially parallel to the first and second plates 186, 188. The separator wall 196 may be a continuous wall running between the top 192 and the bottom 194 or may be comprised of multiple sections. For example, the separator wall may include an upper section 202 and a lower section 204 that are separated by an air gap 206.

A first cavity 198 is defined between the first plate 186 and the separator wall 196. A second cavity 200 is defined between the second plate 188 and the separator wall 196. Each of the first and second cavities may have a C-channel shape. The first cavity 198 may include a heat-transfer chamber 208, an inlet chamber 210 and an outlet chamber 212. A first plate 214 separates the heat-transfer chamber 208 from the inlet and outlet chambers 210, 212. The first plate 214 may be connected to the separator wall 196 by at least one wall. For example, two walls 216 and 218 may connect the first plate 214 to the separator wall 196. The first plate 214 may include opposing longitudinal sides 220 that are each spaced apart form one of the top 192 or the bottom 194 to create a pair of openings 222 along a length of the cavity 198. The openings 222 fluidly connect the chambers to each other. The second cavity 200 may be similar to the first cavity 198 and the above description may apply to the second cavity 200.

The thermal plate 182 may include a pair of end caps 224 disposed on opposing ends of the plate 182 to seal the first and second cavities 198, 200. Each end cap may include an inlet port or an outlet port. The ports allow fluid to enter and exit the thermal plate 182 as described above.

In an alternative embodiment, the separator wall 196 may be omitted. In this embodiment the pair of inlet chambers is combined to form one large inlet chamber and the pair of outlet chambers is combined to form one large outlet chamber. The inner walls and plates in this embodiment may be held in place via connections at each end cap.

Figure 9:
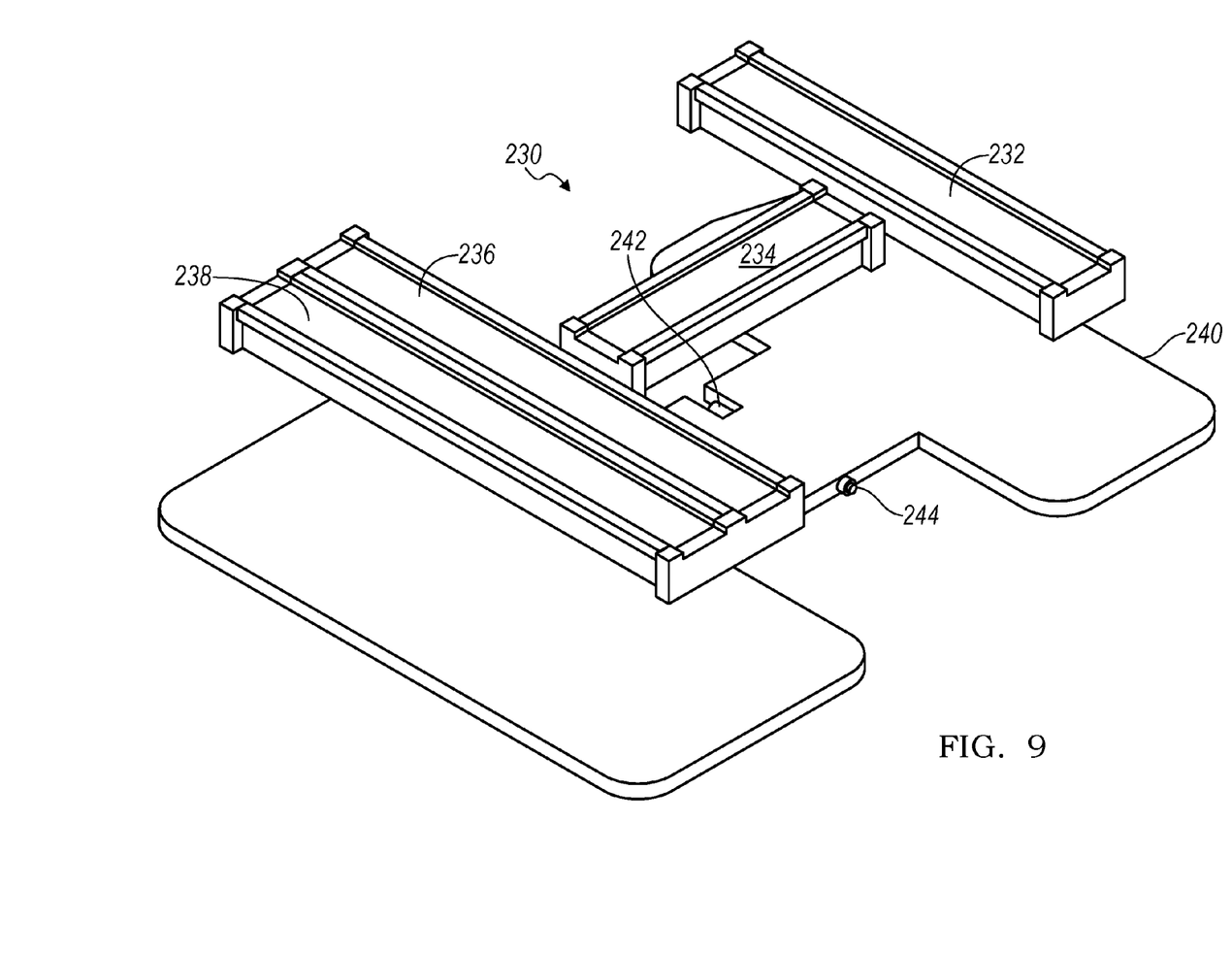
FIG. 9 is an exploded view of another traction battery assembly.

Another traction battery assembly 230 is shown in FIG. 9. The traction battery assembly 230 includes multiple battery arrays 232, 234, 236 and 238 comprised of interconnected battery cells in contact with a thermal device 240. A fluid inlet port 242 and a fluid exit port 244 are provided on the thermal device 240. The battery arrays are positioned on the thermal device 240 such that one side of each of the arrays contacts a surface of the thermal device 240. The cooling device 240 also serves as a base support for the battery arrays. The bottom layer of the cooling device may be made of material that can withstand impact from various environmental factors, such as road debris. Examples of the bottom layer material are aluminum and graphite. The orientation of the arrays relative to the thermal device may be varied. For example, the arrays may be positioned side-by-side with the cooling device.

Figure 10:
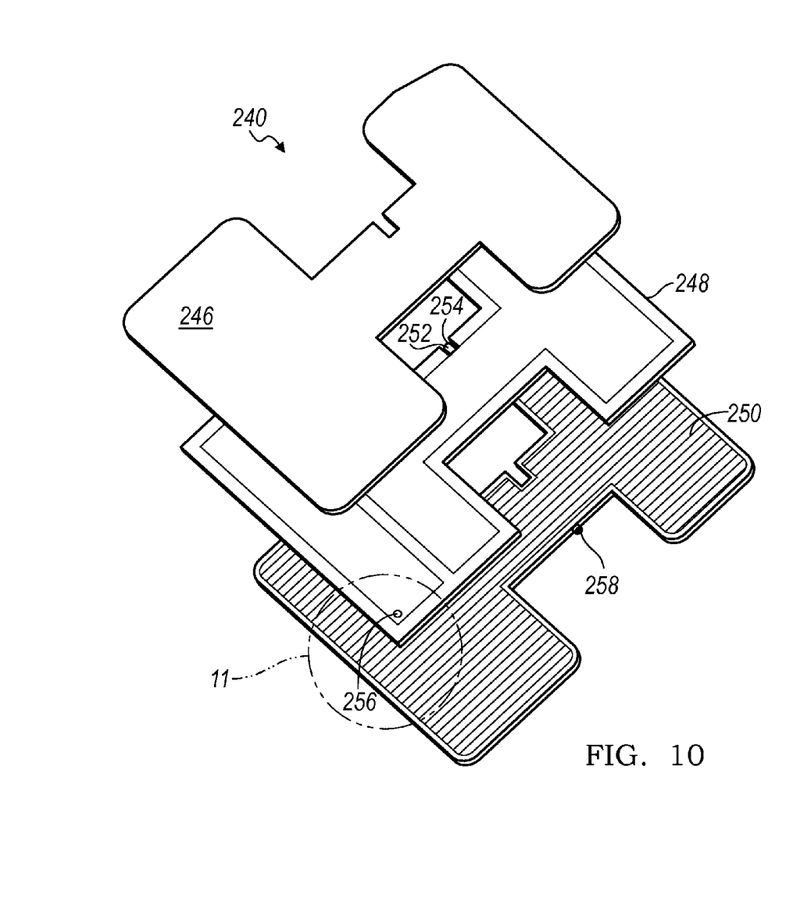
FIG. 10 is an exploded view of the thermal device of the traction battery assembly of FIG. 9.

Referring to FIG. 10, the thermal device 240 includes a first layer 246, a second layer 248, and a third layer 250. The first layer 246 may be made of a thermally conductive material such as aluminum. The second and third layers 248, 250 may be made of either thermally conductive or thermally insulating materials. The first layer 246 and the second layer 248 are attached to each other around their perimeter to form an incoming fluid flow chamber. The first layer 246 also defines a notch to provide space for an inlet nozzle 252 disposed on the second layer 248. When the first layer 246 and the second layer 248 are attached to each other around their perimeter, an inlet port 254 is formed. The inlet nozzle 252 is attached to the inlet port 254. The second layer 248 and the third layer 250 are also attached to each other around their perimeter to form an outgoing fluid flow chamber. The first, second, and third layers may be attached using permanent seals or serviceable seals. The layers may be additionally connected at select points within the perimeter to increase connection strength between the layers.

Figure 11:
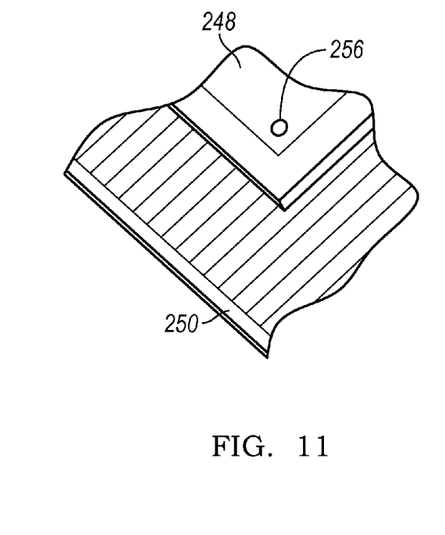
FIG. 11 is a close-up view of a portion of the thermal device showing one of the fluid exit holes of the second layer of the fluid device.

Fluid enters the thermal device 240 at the inlet port 254. The fluid is distributed within the incoming fluid flow chamber formed between the first layer 246 and the second layer 248. The second layer 248 defines fluid exit holes 256. In FIG. 11, the fluid exit hole 256 is at the corner of the second layer. Once the fluid in the incoming fluid flow chamber reaches the corner of the second layer 248, the fluid flows through the fluid exit hole 256 to the outgoing fluid flow chamber. The fluid is distributed within the outgoing fluid flow chamber and exits via the outlet port 258.

Figure 12:
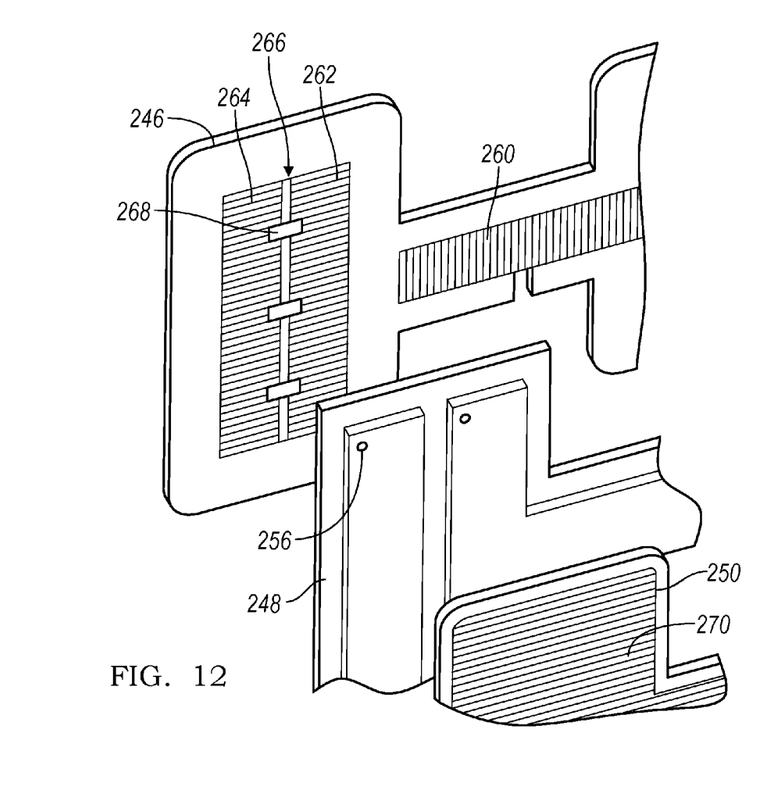
FIG. 12 is a close-up view of a portion of the fluid device showing the flow guides on the first layer and the third layer.

In FIG. 12, the first layer 246 includes several flow guides to distribute the fluid within the incoming fluid flow chamber. One form of flow guides is a set of parallel depressions 260. The parallel depressions 260 aid in circulating the fluid. Another form of flow guides is a plurality of ridges 262 and 264 formed on portion 266 of the first layer 246. Another form of flow guides is a plurality of ribs 268 attached to the portion 266 of the first layer 246. The sets of ridges and the ribs aid in circulating the fluid from one end of the incoming flow chamber to the opposite end. The third layer 250 also defines a ridged surface 270 to facilitate circulation of the fluid within the outgoing fluid chamber.

The thermal device 240 provides a double tier heat transfer assembly that substantially separates fluid coming from an inlet from fluid that has already obtained heat transfer from the battery cells to maximize the efficiency in thermally regulating the battery cells that are in contact with the thermal device 240. The battery arrays that are in contact with the first layer 246 are cooled when fluid enters through the inlet port 254 and is distributed within the incoming fluid chamber. The fluid gets heated by the battery arrays and passes through the exit holes of the second layer 248 to be transferred to the outgoing fluid chamber, which is distant from the battery arrays. The thermal device 240 ensures that the battery arrays consistently receive less heated fluid, as the incoming fluid drives the heated fluid that has been heated by the battery cells to the outgoing fluid chamber. The thermal device 240 has an inlet port and an outlet port that are in separate tiers and in separate chambers. This enables the thermal device 240 to substantially separate the incoming fluid from the heated fluid that has absorbed heat from the battery cells, which helps maximized heat exchange between the fluid and the battery cells.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery assembly comprising:
   cells stacked in an array; and
   a thermal plate disposed against the array, the thermal plate including a C-channel interior defined by heat-transfer, inlet and outlet chambers configured to circulate fluid therein, the chambers spanning a length of the array, and the heat-transfer chamber being disposed between the array and the inlet and outlet chambers.

2. The traction battery assembly of claim 1 wherein the thermal plate includes a mid-plate arranged to separate the heat-transfer chamber from each of the inlet and outlet chambers.

3. The traction battery assembly of claim 1 wherein the C-channel interior is configured such that an air gap separates the inlet and outlet chambers.

4. The traction battery assembly of claim 1 wherein the thermal plate further includes a thermal separator disposed between the heat-transfer chamber and the inlet chamber and between the heat-transfer chamber and the outlet chamber.

5. The traction battery assembly of claim 1 wherein the thermal plate further includes a top disposed against the array, a pair of opposing vertical sidewalls extending from the top, a bottom connected between the pair of sidewalls, and a mid-plate disposed between the top and bottom, and wherein the bottom has at least one vertical wall extending to the mid-plate.

6. The traction battery assembly of claim 5 wherein the top, mid-plate and opposing sidewalls cooperate to define the heat-transfer chamber.

7. The traction battery assembly of claim 5 wherein the bottom further includes a first section extending from one of the pair of sidewalls and a second section extending form the other of the pair of sidewalls, wherein the at least one vertical wall further includes a first wall and a second wall, wherein the first wall is connected to an end of the first section and extends vertically to the mid-plate, and wherein the second wall is connected to an end of the second section and extends vertically to the mid-plate.

8. The traction battery assembly of claim 7 wherein the first section, the first vertical wall, the mid-plate and one of the pair of sidewalls cooperate to define the inlet chamber, and wherein the second section, the second vertical wall, the mid-plate and the other of the pair of sidewalls cooperate to define the outlet chamber.

9. The traction battery assembly of claim 1 further including an inlet end cap sealing a first side of the C-channel interior and an outlet end cap sealing a second side of the C-channel interior that is opposite the first, wherein each end cap includes a port fluidly connecting the end cap to a fluid line.

10. The traction battery assembly of claim 1 further comprising fins attached to a surface of the C-channel interior within the heat-transfer chamber.

11. A battery assembly comprising:
    a cell array; and
    a thermal plate defining an interior including a top adjacent the array, opposing side surfaces and a mid-plate arranged to define a pair of openings that are each defined between the mid-plate and one of the side surfaces, the interior further including a heat-transfer chamber above the mid-plate and inlet and outlet chambers below the mid-plate, wherein the chambers are fluidly connected via the openings, and the inlet chamber includes an inlet port and the outlet chamber includes an outlet port, and wherein the interior is configured such that fluid enters the interior via the inlet port and circulates from the inlet chamber, up through one of the openings, across the heat-transfer chamber, down into the outlet chamber via the other opening and out the outlet port.

12. The battery assembly of claim 11 wherein the mid-plate further includes a pair of opposing longitudinal sidewalls spanning a length of the interior and wherein each sidewall is spaced apart from one of the side surfaces to define the openings.

13. The battery assembly of claim 11 wherein the interior further includes a bottom and the mid-plate is attached to the bottom.

14. The battery assembly of claim 11 further comprising a plurality of fins disposed between the top and the mid-plate, wherein the fins each include a longitudinal side that is substantially perpendicular to the opposing side surfaces.

15. The battery assembly of claim 11 wherein the thermal plate defines a channel disposed between the inlet chamber and the outlet chamber.

16. The battery assembly of claim 11 wherein the inlet chamber extends along an entire length of one of the side surfaces and the outlet chamber extends along an entire length of the other of the side surfaces.

17. A traction battery assembly comprising:
    first and second arrays, each including a plurality of stacked cells; and
    a thermal plate defining opposing first and second sides, and sandwiched between the arrays such that the first side is disposed against the first array and the second side is disposed against the second array, the thermal plate including a separator wall disposed between the first and second sides to define a first fluid cavity between the first side and the separator wall and a second fluid cavity between the second side and the separator wall, wherein the first cavity is configured to circulate coolant therethrough to cool the first array and includes a first plate disposed between the first side and the separator wall, and wherein the second cavity is configured to circulate coolant therethrough to cool the second array and includes a second plate disposed between the second side and the separator wall.

18. The traction battery assembly of claim 17 wherein the first plate is attached to the separator wall such that the first plate is spaced apart from separator wall to define a pair of inlet and outlet chambers that are in fluid communication with a heat transfer chamber defined between the first plate and the first side.

19. The traction battery assembly of claim 18 wherein the second plate is attached to the separator wall such that the second plate is spaced apart from the separator wall to define another pair of inlet and outlet chambers that are in fluid communication with a heat transfer chamber defined between the second plate and the second side.

* * * * *